(12) United States Patent
Tokuzumi et al.

(10) Patent No.: US 12,234,326 B2
(45) Date of Patent: Feb. 25, 2025

(54) POLYPHENYLENE SULFIDE RESIN COMPOSITION AND MOLDED ARTICLE

(71) Applicant: Toray Industries, Inc., Tokyo (JP)

(72) Inventors: Keita Tokuzumi, Nagoya (JP); Kazuya Okubo, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 694 days.

(21) Appl. No.: 17/440,262

(22) PCT Filed: Mar. 19, 2020

(86) PCT No.: PCT/JP2020/012317
§ 371 (c)(1),
(2) Date: Sep. 17, 2021

(87) PCT Pub. No.: WO2020/196273
PCT Pub. Date: Oct. 1, 2020

(65) Prior Publication Data
US 2022/0010073 A1    Jan. 13, 2022

(30) Foreign Application Priority Data

Mar. 27, 2019  (JP) .................. 2019-059992
Dec. 12, 2019  (JP) .................. 2019-224205

(51) Int. Cl.
| | | |
|---|---|---|
| C08L 81/04 | (2006.01) | |
| C08G 75/0259 | (2016.01) | |
| C08K 3/26 | (2006.01) | |
| C08K 7/14 | (2006.01) | |

(52) U.S. Cl.
CPC ............ C08G 75/0259 (2013.01); C08K 3/26 (2013.01); C08K 7/14 (2013.01); *C08K 2003/265* (2013.01); *C08K 2201/019* (2013.01)

(58) Field of Classification Search
None
See application file for complete search history.

(56) References Cited

U.S. PATENT DOCUMENTS

| | | |
|---|---|---|
| 10,370,522 B2 | 8/2019 | Peng et al. |
| 2010/0063192 A1 | 3/2010 | Okubo et al. |
| 2010/0113671 A1* | 5/2010 | Kinouchi ............... C08L 81/02 524/451 |

FOREIGN PATENT DOCUMENTS

| | | |
|---|---|---|
| JP | 2005-161693 A | 6/2005 |
| JP | 2008-285511 A | 11/2008 |
| JP | 2009-007552 A | 1/2009 |
| JP | 2010-043229 A | 2/2010 |
| JP | 2011-026439 A | 2/2011 |
| JP | 2016-535147 A | 11/2016 |
| WO | 2008/038512 A1 | 4/2008 |
| WO | 2014/103814 A1 | 7/2014 |
| WO | 2018/198850 A1 | 11/2018 |
| WO | 2019/208709 A1 | 10/2019 |

\* cited by examiner

*Primary Examiner* — Michael J Feely
(74) *Attorney, Agent, or Firm* — DLA Piper LLP (US)

(57) ABSTRACT

A polyphenylene sulfide resin composition includes a blend of the following: 100 parts by weight of a polyphenylene sulfide resin (A); 100 to 250 parts by weight of a modified cross-section glass fiber (B); and 25 to 150 parts by weight of a non-fibrous inorganic filler (C) satisfying the following (C-a) and (C-b): (C-a) having a Mohs hardness of more than 2 and less than 4, and (C-b) having a melting point or softening point of 380° C. or more; wherein the ratio X/Y of the mass X of the modified cross-section glass fiber (B) to the mass Y of the non-fibrous inorganic filler (C) is more than 1 and less than 7.

7 Claims, 2 Drawing Sheets

POLYPHENYLENE SULFIDE RESIN COMPOSITION AND MOLDED ARTICLE

TECHNICAL FIELD

This disclosure relates to a polyphenylene sulfide resin composition whose mechanical properties and dimensional stability are excellent, particularly the anisotropy of which is significantly reduced, and the expansion of which is reduced in moist heat treatment.

BACKGROUND

A polyphenylene sulfide ("PPS" in some instances) resin is an engineering plastic having excellent heat resistance, flame retardance, chemical resistance, electrical insulation properties, moist heat resistance, mechanical strength, and dimensional stability, can be molded into any of the various kinds of molded articles, fiber, or film by any of the various kinds of molding method such as injection molding or extrusion molding, and thus, serves for practical use in a wide range of fields such as electrical and electronic parts, mechanical parts, and automobile parts.

From the viewpoint of obtaining desired characteristics, a PPS resin composition obtained by reinforcing a PPS resin with a fibrous inorganic filler expresses anisotropy in connection with expansion due to heat arising from the orientation of the fibrous inorganic filler, in connection with the mechanical strength, and in connection with the amount of plastic transformation caused by a stress applied continuously. Accordingly, such a PPS resin composition has low design freedom compared to metal, and is subjected to restriction in some applications. In addition, a PPS resin has low water absorbing properties, but has a drawback in that the PPS resin undergoes moist heat expansion in a moist heat environment, and thus, cannot hold its original dimensions.

In recent years, it has been desired that precision parts such as electronic parts and camera parts not only have mechanical strength and flame retardance, but also generate a smaller amount of gas during molding (low gas pollution), exhibit a smaller amount of plastic transformation against a stress applied, and have no anisotropy (low anisotropy). Furthermore, it has been demanded that such precision parts undergo smaller swelling (lower moist heat expansion) in a moist heat environment.

In general, one known technique of reducing the anisotropy of a resin composition involves filling glass fibers having a flat cross-sectional shape to provide a thermoplastic resin composition having low anisotropy, as described in JP 2011-26439 A, WO 2008/038512, and JP 2016-535147 A.

JP '439 describes an improvement in the anisotropy of molding shrinkage, but involves using a polycarbonate and thus exhibiting large expansion in a moist heat environment, and fails in precise dimension control of a molded article.

WO '512 and JP '147 describe an improvement in dimensional stability, but involves using only a glass fiber having flatness and thus resulting in causing a difference in expansion between the flow direction of a resin and the direction perpendicular to the flow when the temperature changes during molding.

It could therefore be helpful to provide a PPS resin composition whose dimensional stability and low anisotropy are excellent, and the swelling of which is reduced during moist heat treatment, without significantly impairing the properties originally possessed by the PPS resin such as excellent mechanical properties and chemical resistance.

SUMMARY

We thus provide:

[1] A polyphenylene sulfide resin composition including a blend of the following:
  100 parts by weight of a polyphenylene sulfide resin (A);
  100 to 250 parts by weight of a modified cross-section glass fiber (B); and
  25 to 150 parts by weight of a non-fibrous inorganic filler (C) satisfying the following (C-a) and (C-b): (C-a) having a Mohs hardness of more than 2 and less than 4, and (C-b) having a melting point or softening point of 380° C. or more;
  wherein the ratio X/Y of the blending weight X of the modified cross-section glass fiber (B) to the blending weight Y of the non-fibrous inorganic filler (C) is more than 1 and less than 7; or

[2] A polyphenylene sulfide resin composition including a blend of the following: 100 parts by weight of a polyphenylene sulfide resin (A);
  100 to 250 parts by weight of a modified cross-section glass fiber (B); and
  25 to 150 parts by weight of a non-fibrous inorganic filler (C) (excluding hexagonal boron nitride, magnesium hydroxide, talc, magnesium oxide, and aluminium nitride),
  wherein the ratio X/Y of the blending weight X of the modified cross-section glass fiber (B) to the blending weight Y of the non-fibrous inorganic filler (C) is more than 1 and less than 7.

A molded article is composed of the above-mentioned polyphenylene sulfide resin composition.

In our polyphenylene sulfide resin composition, the ratio of the major axis (the longest direct distance of the cross-section) of the modified cross-section glass fiber (B) to the minor axis (the longest direct distance in the direction perpendicular to the major axis) is preferably 1.3 to 10.

The ratio X/Y of the blending weight X of the modified cross-section glass fiber (B) to the blending weight Y of the non-fibrous inorganic filler (C) relative to 100 parts by weight of the polyphenylene sulfide resin (A) is preferably more than 1 and less than 5.

The non-fibrous inorganic filler (C) described above is preferably calcium carbonate.

A molded article is preferably a housing part.

We make it possible to provide the following: a polyphenylene sulfide resin composition whose mechanical properties and dimensional stability are excellent, particularly the anisotropy of which is significantly reduced, and the expansion of which is reduced in moist heat treatment; and a molded article of the resin composition.

REFERENCE SIGNS LIST

Figure 1A:
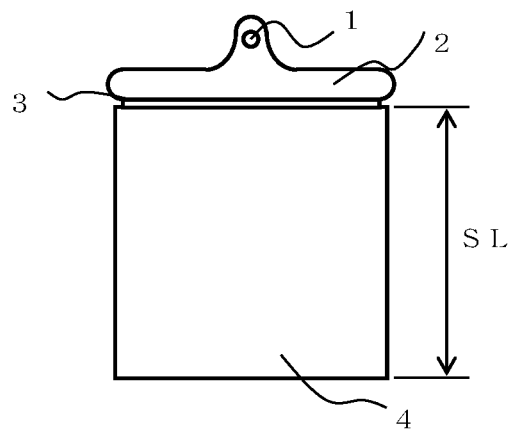
FIGS. 1(a) and (b) include (a) a top view and (b) a side view that depict the shape of a flat plate for cutting 4 for producing a test piece to be used to evaluate the coefficient of linear expansion, swelling properties, and creep characteristics.

1 Sprue
2 Runner

3 Gate
4 Flat Plate for Cutting for Producing Test Piece
5 and 6 Test Piece Produced out of Flat Plate for Cutting

DETAILED DESCRIPTION

Below, examples will be described in detail.

Our PPS resin (A) is a polymer having a repeating unit represented by structural formula (1). From the viewpoint of heat resistance, the PPS resin is preferably a polymer containing 70 mol % or more, more preferably 90 mol % or more, of repeating unit represented by the structural formula.

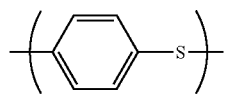
(1)

In addition, approximately less than 30 mol % of the repeating unit of the PPS resin may be constituted by a repeating unit having the following structures and/or the like.

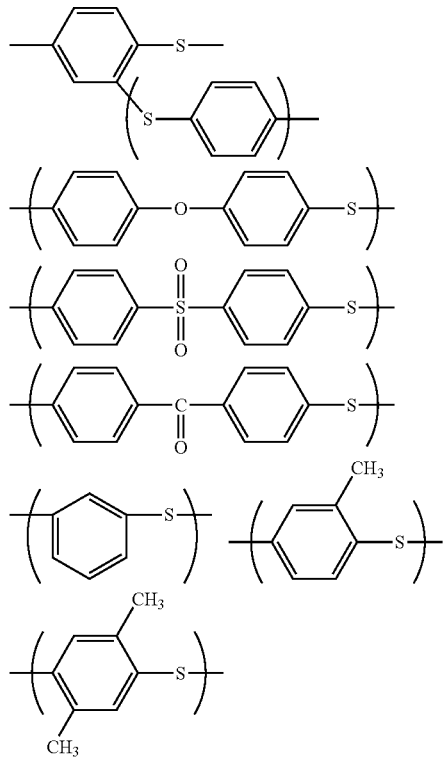

Below, a method of producing a PPS resin will be described. First, the details of a polyhalogenated aromatic compound, sulfidation agent, polymerization solvent, molecular weight modifier, polymerization auxiliary, and polymerization stabilizer that are to be used will be described.

Polyhalogenated Aromatic Compound

A polyhalogenated aromatic compound refers to a compound having two or more halogen atoms in one molecule. Specific examples of polyhalogenated aromatic compounds include p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5-dichloro-p-xylene, 1,4-dibromobenzene, 1,4-diiodobenzene, 1-methoxy-2,5-dichlorobenzene, and the like, and p-dichlorobenzene is preferably used. In addition, it is possible to combine two or more different polyhalogenated aromatic compounds to form a copolymer, but it is preferable to use a p-dihalogenated aromatic compound as a main component.

The amount of such a polyhalogenated aromatic compound to be used can be, for example, 0.9 to 2.0 mol, preferably 0.95 to 1.5 mol, still more preferably 1.005 to 1.2 mol, per 1 mol of sulfidation agent from the viewpoint of obtaining a PPS resin having a viscosity suitable for processing.

Sulfidation Agent

Examples of sulfidation agents include alkali metal sulfides, alkali metal hydrosulfides, and hydrogen sulfide.

Specific examples of alkali metal sulfides include lithium sulfide, sodium sulfide, potassium sulfide, rubidium sulfide, cesium sulfide, and mixtures of two or more kinds thereof, and among these, sodium sulfide is preferably used. These alkali metal sulfides can each be used in the form of a hydrate or aqueous mixture or in the form of an anhydride.

Specific examples of alkali metal hydrosulfides include sodium hydrosulfide, potassium hydrosulfide, lithium hydrosulfide, rubidium hydrosulfide, cesium hydrosulfide, and mixtures of two or more kinds thereof, and sodium hydrosulfide is preferably used. These alkali metal hydrosulfides can each be used in the form of a hydrate or aqueous mixture or in the form of an anhydride.

In addition, it is possible to use a sulfidation agent prepared from an alkali metal hydrosulfide and an alkali metal hydroxide in situ in a reaction system. In addition, it is possible that a sulfidation agent prepared from an alkali metal hydrosulfide and an alkali metal hydroxide is transferred into a polymerization vessel, and used.

Alternatively, it is also possible to use a sulfidation agent prepared from a hydrogen sulfide and an alkali metal hydroxide such as lithium hydroxide or sodium hydroxide in situ in a reaction system. In addition, it is possible that a sulfidation agent prepared from a hydrogen sulfide and an alkali metal hydroxide such as lithium hydroxide or sodium hydroxide is transferred into a polymerization vessel, and used.

When part of a sulfidation agent is lost through a dehydration operation or the like before the start of polymerization reaction, the amount of the sulfidation agent fed means the residual amount obtained by subtracting the loss from the actual feed amount.

In this regard, it is also possible to use an alkali metal hydroxide and/or an alkaline earth metal hydroxide in combination with a sulfidation agent. Specific examples of preferable alkali metal hydroxides include sodium hydroxide, potassium hydroxide, lithium hydroxide, rubidium hydroxide, cesium hydroxide, and mixtures of two or more kinds thereof. Specific examples of alkaline earth metal hydroxides include calcium hydroxide, strontium hydroxide, barium hydroxide and the like. Among these, sodium hydroxide is preferably used.

When an alkali metal hydrosulfide is used as a sulfidation agent, it is particularly preferable to use an alkali metal hydroxide simultaneously. The amount of such an alkali metal hydroxide to be used can be, for example, 0.95 to 1.20 mol, preferably 1.00 to 1.15 mol, still more preferably 1.005 to 1.100 mol, relative to 1 mol of alkali metal hydrosulfide.

Polymerization Solvent

A polymerization solvent to be preferably used is an organic polar solvent. Specific examples include the following: N-alkylpyrrolidones such as N-methyl-2-pyrrolidone and N-ethyl-2-pyrrolidone; caprolactams such as N-methyl-ε-caprolactam; aprotic organic solvents typified by 1,3-dimethyl-2-imidazolidinone, N,N-dimethylacetamide, N,N-dimethylformamide, hexamethylphosphoric triamide, dimethylsulfone, tetramethylene sulfoxide and the like; mixtures thereof; and the like. Any of these has high reaction stability, and thus, is preferably used. Among these, N-methyl-2-pyrrolidone (hereinafter referred to as NMP for short) in particular is preferably used.

The range selected for the amount of the organic polar solvent to be used is 2.0 mol to 10 mol, preferably 2.25 to 6.0 mol, more preferably 2.5 to 5.5 mol, per 1 mol of the sulfidation agent.

Molecular Weight Modifier

A monohalogenated compound (that does not necessarily need to be an aromatic compound) can be used in combination with the above-mentioned polyhalogenated aromatic compound, for example, to form an end of a PPS resin to be generated, or to regulate the polymerization reaction and/or the molecular weight.

Polymerization Auxiliary

It is also one of the preferable aspects to use a polymerization auxiliary to obtain a PPS resin having a relatively high polymerization degree in a shorter time. A polymerization auxiliary means a substance having the effect of increasing the viscosity of the resulting PPS resin. Specific examples of such polymerization auxiliaries include organic carboxylates, water, alkali metal chlorides, organic sulfonates, alkali metal sulfates, alkaline earth metal oxides, alkali metal phosphates, alkaline earth metal phosphates and the like. These can be used singly or in combination of two or more kinds thereof. Among these, an organic carboxylate and/or water is/are preferably used.

The above-mentioned alkali metal carboxylate is a compound represented by $R(COOM)_n$, wherein R is a $C_{1-20}$ alkyl group, cycloalkyl group, aryl group, alkylaryl group, or arylalkyl group; M is an alkali metal selected from lithium, sodium, potassium, rubidium, and cesium; and n is an integer of 1. The alkali metal carboxylate can also be used in the form of a hydrate, anhydride, or aqueous solution. Specific examples of alkali metal carboxylates include lithium acetate, sodium acetate, potassium acetate, sodium propionate, lithium valerate, sodium benzoate, sodium phenylacetate, potassium p-toluate, mixtures thereof and the like.

An alkali metal carboxylate may be formed by adding an organic acid to one or more compounds selected from the group consisting of alkali metal hydroxides, alkali metal carbonates, alkali metal bicarbonates and the like in substantially equal chemical equivalents, and by allowing the resulting mixture to react. Among the above-mentioned alkali metal carboxylates, lithium salts have high solubility into a reaction system, and have a large auxiliary effect, but are expensive. Potassium, rubidium, and cesium salts are considered to have insufficient solubility into a reaction system, and thus, sodium acetate that is inexpensive and has moderate solubility into a polymerization system is most preferably used.

When any of these polymerization auxiliaries is used, the usage amount is usually 0.01 mol to 0.7 mol relative to 1 mol of alkali metal sulfide to be fed, preferably 0.1 to 0.6 mol, more preferably 0.2 to 0.5 mol, in the sense of obtaining a higher polymerization degree.

In addition, using water as a polymerization auxiliary is one of the effective means to obtain a resin composition having a high degree of balance between flowability and high toughness. In this example, the addition amount is usually 0.5 mol to 15 mol relative to 1 mol of alkali metal sulfide to be fed, preferably 0.6 to 10 mol, more preferably 1 to 5 mol, in the sense of obtaining a higher polymerization degree.

These polymerization auxiliaries are not limited to any particular addition timing, and may be added at any time in the below-mentioned preliminary step, at the start of polymerization, or during polymerization, or may be added in a plurality of installments. When an alkali metal carboxylate is used as a polymerization auxiliary, the polymerization auxiliary is more preferably added simultaneously at the start of the preliminary step or at the start of polymerization from the viewpoint of ease of addition. Additionally, when water is used as a polymerization auxiliary, it is effective to add the water during polymerization reaction after feeding a polyhalogenated aromatic compound.

Polymerization Stabilizer

To stabilize a polymerization reaction system and prevent a side reaction, it is also possible to use a polymerization stabilizer. A polymerization stabilizer contributes to stabilization of a polymerization reaction system and inhibits an undesirable side reaction. One indication of a side reaction is, for example, generation of thiophenol, and adding a polymerization stabilizer makes it possible to inhibit such generation of thiophenol. Specific examples of polymerization stabilizers include compounds such as alkali metal hydroxides, alkali metal carbonates, alkaline earth metal hydroxides, and alkaline earth metal carbonates. Among these, alkali metal hydroxides such as sodium hydroxide, potassium hydroxide, and lithium hydroxide are preferable. The above-mentioned alkali metal carboxylate also acts as a polymerization stabilizer, and is regarded as one of the polymerization stabilizers. Additionally, when an alkali metal hydrosulfide is used as a sulfidation agent, using an alkali metal hydroxide simultaneously is particularly preferable as above-mentioned. The alkali metal hydroxide used excessively relative to the sulfidation agent can be a polymerization stabilizer.

These polymerization stabilizers can be used singly or in combination of two or more kinds thereof. The polymerization stabilizer is preferably used usually at a ratio of 0.02 to 0.2 mol, preferably 0.03 to 0.1 mol, more preferably 0.04 to 0.09 mol, relative to 1 mol of the alkali metal sulfide fed. With such a preferable ratio, the stabilization effect is sufficient, and in addition, the polymer yield is excellent.

The polymerization stabilizers are not limited to any particular addition timing, and may be added at any time in the below-mentioned preliminary step, at the start of polymerization, or during polymerization, or may be added in a plurality of installments. The polymerization stabilizers are more preferably added simultaneously at the start of the preliminary step or at the start of polymerization.

Next, a preliminary step, a polymerization reaction step, and a collection step will be specifically described in order.

Preliminary Step

A sulfidation agent is usually used in the form of a hydrate, and it is preferable to raise the temperature of a mixture containing an organic polar solvent and a sulfidation agent before adding a polyhalogenated aromatic compound, and to remove an excessive amount of water from the system. In this regard, when too much water has been removed in this operation, it is preferable to add water to make up the shortfall.

As above-mentioned, it is also possible to use, as a sulfidation agent, an alkali metal sulfide prepared from an alkali metal hydrosulfide and an alkali metal hydroxide in situ in a reaction system or in a vessel other than a polymerization vessel. Examples of such a method include, but are not limited particularly to, a method in which an alkali metal hydrosulfide and an alkali metal hydroxide are added to an organic polar solvent preferably under an inert gas atmosphere in the temperature range of normal temperature to 150° C., preferably normal temperature to 100° C., and the temperature is raised up to at least 150° C. or more, preferably 180 to 245° C., at normal pressure or under reduced pressure to evaporate moisture. At this stage, a polymerization auxiliary may be added. In addition, toluene or the like may be added during the reaction to promote the evaporation of moisture.

In the polymerization reaction, the amount of moisture in the polymerization system is preferably 0.5 to 10.0 mol per 1 mol of the sulfidation agent fed. The amount of moisture in the polymerization system is an amount obtained by subtracting the amount of moisture removed from the polymerization system from the amount of moisture fed into the polymerization system. In addition, the water to be fed may be in any form such as water, an aqueous solution, or crystal water.

Polymerization Reaction Step

It is preferable to produce a PPS resin powder and granular material by allowing a sulfidation agent and a polyhalogenated aromatic compound to react in an organic polar solvent at a temperature of 200° C. or more and less than 290° C.

For the start of a polymerization reaction step, the sulfidation agent and the polyhalogenated aromatic compound are preferably added to the organic polar solvent under an inert gas atmosphere at a temperature of normal temperature to 215° C., preferably 100 to 215° C. At this stage, a polymerization auxiliary may be added. The feeding order of these raw materials may be randomly sequential or simultaneous.

The temperature of such a mixture is raised usually to 200° C. to 290° C. The temperature-raising speed is not limited to any particular value, and is usually selected from 0.01 to 5° C./min, more preferably 0.1 to 3° C./min.

In general, the temperature is raised finally up to 250 to 290° C., and at the temperature, the reaction is allowed to progress usually for 0.25 to 50 hours, preferably 0.5 to 20 hours.

A method effective to obtain a higher polymerization degree is a method in which, in a stage preceding the attainment of the final temperature, the reaction is allowed to progress, for example, at 200° C. to 245° C. for a given time, and then, the temperature is raised to 270 to 290° C. In this example, the reaction time at 200° C. to 245° C. is usually selected from 0.25 to 20 hours, preferably 0.25 to 10 hours.

In this regard, it is effective to perform polymerization through a plurality of stages to obtain a polymer having a higher polymerization degree. Performing polymerization through a plurality of stages is effective when the polymerization is performed when the conversion ratio of a polyhalogenated aromatic compound in the system at 245° C. reaches 40 mol % or more, preferably 60 mol %.

Collection Step

Upon termination of polymerization, a solid is collected from the polymerization reactant containing a polymer, solvent and the like.

A method of collecting a PPS resin is most preferably performed under rapid cooling conditions, and one preferable example of such a collection method is a flush method. A flush method is a method in which polymerization reactants in a high-temperature and high-pressure state (usually at 250° C. or more and 8 kg/cm$^2$ or more) are flushed into a normal-pressure or reduced-pressure atmosphere to form a polymer in the form of powder and granules. The polymer is collected at the same time as the solvent is collected. Flushing means spouting a polymerization reactant through a nozzle. Specific examples of such an atmosphere for flushing include nitrogen or water vapor under normal pressure, and the temperature is selected usually 150° C. to 250° C.

The flush method makes it possible to collect a solid at the same time as a solvent, also makes it possible to make the collection time relatively shorter, and thus, is a collection method having excellent economical efficiency. This collection method makes it more likely that an ionic compound typified by Na or an organic compound having a low polymerization degree (oligomer) is incorporated into a polymer in the solidification process.

However, a PPS resin collection method is not limited to a flush method. It is possible to use a method in which a particulate polymer slowly cooled is collected (a quenching method), provided that the method satisfies the requirements. Considering economical efficiency and capability, however, it is more preferable that a PPS resin collected by a flush method is used in a production method.

A PPS resin that is preferably used is, for example, a PPS resin having undergone the above-mentioned polymerization reaction step and collection step followed by undergoing thermal oxidation. It is preferable that the thermal oxidation treatment step is preferably preceded by hot-water treatment and acid treatment. In addition, the acid treatment step and the hot-water treatment step may be preceded by a step of washing with an organic solvent.

An acid used for acid treatment is not limited to any particular acid, provided that the acid has no effect of decomposing a PPS resin. Examples of such acids include acetic acid, hydrochloric acid, sulfuric acid, phosphoric acid, silic acid, carbonic acid, propyl acid and the like. Among these, acetic acid and hydrochloric acid are more preferably used, and acids that decompose or degrade a PPS resin such as nitric acid, are not preferable.

Water to be used with an aqueous solution of acid is preferably distilled water or deionized water. Such an aqueous solution of acid preferably has a pH of 1 to 7, more preferably a pH of 2 to 4. The pH of 7 or less does not cause the metal content of the PPS resin to increase, and the pH of 1 or more does not cause the volatile component of the PPS resin to increase.

A method of acid treatment preferably includes immersing a PPS resin in acid or an aqueous solution of acid, and can include stirring and heating suitably, if necessary. The heating temperature is preferably 80 to 250° C., more preferably 120 to 200° C., still more preferably 150 to 200° C. The heating temperature of 80° C. or more causes the acid treatment effect to be sufficient, and does not increase the metal content, and 250° C. or less does not cause the pressure to be too high, and these temperatures are preferable in terms of safety. In addition, the pH at which the PPS resin is immersed and treated in the aqueous solution of acid is preferably brought to 8 or less by the acid treatment, and such a pH is more preferably 2 to 8. The pH of 8 or less does not cause the metal content of the PPS resin to increase.

The acid treatment time is preferably a period of time in which the reaction between the PPS resin and the acid reaches sufficient equilibrium, and is preferably 2 to 24 hours for treatment at 80° C., preferably 0.01 to 5 hours for treatment at 200° C.

It is preferable that the PPS resin is sufficiently immersed and treated in the acid or the aqueous solution of acid. Thus, the ratio of the acid or the aqueous solution of acid to the PPS resin in the acid treatment preferably corresponds to 0.5 to 500 L, more preferably 1 to 100 L, still more preferably 2.5 to 20 L, of the acid or the aqueous solution of acid relative to 500 g of the PPS. The acid or acid aqueous solution in an amount of 0.5 L or more relative to 500 g of the PPS resin allows the PPS resin to be sufficiently immersed in the aqueous solution and accordingly be washed sufficiently, thus preventing the metal content of the PPS resin from increasing. In addition, the acid or aqueous solution of acid in an amount of 500 L or less relative to 500 g of the PPS resin allows the amount of solution relative to the PPS resin to be suitable, and allows the production efficiency to be favorable.

Such acid treatment is performed by the following: a method in which a predetermined amount of the PPS resin is introduced into predetermined amounts of water and acid, and heated with stirring in a pressure container; a method in which acid treatment is continuously performed; or the like. An easy and convenient method of separating the aqueous solution and the PPS resin from the treated solution resulting from the acid treatment is filtration using a sieve or a filter, and examples of such methods include natural filtration, pressure filtration, reduced pressure filtration, centrifugal filtration and the like. To remove acid and impurities remaining on the surface of the PPS resin separated from the treated solution, the PPS resin is preferably washed with water or hot water several times. For example, the aqueous solution and the PPS resin are separated by a washing method such as the following: a method in which the PPS resin is filtrated under pouring water in a filtration device; a method in which the PPS resin separated is introduced into water provided preliminarily, and then filtrated again; or the like. Water to be used for washing is preferably distilled water or deionized water.

An acid treatment step is preferably preceded by hot-water treatment, a method of which is as below-mentioned. Water to be used for hot-water treatment is preferably distilled water or deionized water. The hot-water treatment temperature is preferably 80 to 250° C., more preferably 120 to 200° C., still more preferably 150 to 200° C. The hot-water treatment temperature of 80° C. or more allows the hot-water treatment effect to be sufficient, and generates a smaller amount of gas volatilized, and 250° C. or less does not allow the pressure to be too high, and these temperatures are preferable from the viewpoint of safety.

The hot-water treatment time is preferably a period of time in which extraction treatment with the PPS resin and hot water is sufficient, and is preferably 2 to 24 hours for treatment at 80° C., preferably 0.01 to 5 hours for treatment at 200° C.

It is preferable that the PPS resin is sufficiently immersed and treated in water. Thus, the ratio of the water to the PPS resin in the hot-water treatment preferably corresponds to 0.5 to 500 L, more preferably 1 to 100 L, still more preferably 2.5 to 20 L, of the water relative to 500 g of the PPS resin. The water in an amount of 0.5 L or more relative to 500 g of the PPS resin allows the PPS resin to be sufficiently immersed in the water and accordingly be washed sufficiently, thus preventing the amount of gas volatilized from increasing. In addition, the water in an amount of 500 L or less relative to 500 g of the PPS resin allows the ratio of the water relative to the PPS resin to be suitable, and allows the production efficiency to be favorable.

Such hot-water treatment is not limited to any particular operation, and is performed by the following: a method in which a predetermined amount of the PPS resin is introduced into a predetermined amount of water, and the resulting mixture is heated with stirring in a pressure container; a method in which hot-water treatment is continuously performed; and the like. Separating the aqueous solution and the PPS resin from the treated solution resulting from the hot-water treatment is not limited to any particular method. An easy and convenient method of such separation is filtration using a sieve or a filter, and examples of such methods include natural filtration, pressure filtration, reduced pressure filtration, centrifugal filtration and the like. To remove impurities remaining on the surface of the PPS resin separated from the treated solution, the PPS resin is preferably washed with water or hot water several times. Such washing is not limited to any particular method and, for example, the aqueous solution and the PPS resin are separated by a method such as the following: a method in which the PPS resin is filtrated under pouring water in a filtration device; a method in which the PPS resin separated is introduced into water provided preliminarily, and then filtrated again; or the like. Water to be used for washing is preferably distilled water or deionized water.

In addition, the acid treatment and the hot-water treatment are preferably performed under an inert atmosphere from the viewpoint of preventing the end group of the PPS from being decomposed during such acid treatment and hot-water treatment. Examples of inert atmospheres include nitrogen, helium, argon and the like, and a nitrogen atmosphere is preferable from the viewpoint of economical efficiency.

The acid treatment step and the hot-water treatment step may be preceded by a step of washing with an organic solvent, a method of which is as below-mentioned. An organic solvent used to wash the PPS resin is not limited to any particular organic solvent provided that the organic solvent does not have an effect of de-composing the PPS resin or the like. Examples of such organic solvents include the following: nitrogen-containing polar solvents such as N-methyl-2-pyrrolidone, dimethylformamide, dimethylacetamide, 1,3-dimethylimidazolidinone, hexamethylphosphorusamide, and piperazinones; sulfoxide-based and sulfone-based solvents such as dimethyl sulfoxide, dimethylsulfone, and sulfolane; ketone-based solvents such as acetone, methyl ethyl ketone, diethyl ketone, and acetophenone; ether-based solvents such as dimethyl ether, dipropyl ether, dioxane, and tetrahydro-furan; halogen-based solvents such as chloroform, methylene chloride, trichloroethylene, ethylene dichloride, perchloroethylene, monochloroethane, dichloroethane, tetrachloroethane, perchloroethane, and chlorobenzene; alcohol-based and phenol-based solvents such as methanol, ethanol, propanol, butanol, pentanol, ethylene glycol, propylene glycol, phenol, cresol, polyethylene glycol, and polypropylene glycol; aromatic hydrocarbon-based solvents such as benzene, toluene, and xylene; and the like. Among these organic solvents, N-methyl-2-pyrrolidone, acetone, dimethylformamide, chloroform, or the like is particularly preferably used. In addition, these organic solvents are used singly or in mixture of two or more kinds thereof.

A method of washing with an organic solvent is, for example, a method in which the PPS resin is immersed in an organic solvent, and can be suitably stirred or heated, if necessary. A washing temperature at which the PPS resin is washed with an organic solvent is not limited to any particular value, and for this, any temperature of normal temperature to approximately 300° C. can be selected. The higher the washing temperature is, the higher the washing efficiency tends to be, but a washing temperature of normal temperature to 150° C. usually yields a sufficient effect. The PPS resin can be washed under pressure at a temperature equal to or greater than the boiling point of the organic solvent in a pressure container. In addition, the washing time is not limited to any particular value. In batch-type washing, washing for 5 minutes or more usually yields a sufficient effect although depending on the washing conditions. In addition, continuous washing is also possible.

Such acid treatment, hot-water treatment, and washing with an organic solvent can be performed in suitable combination.

Heating Treatment Step

It is preferable that a PPS resin has undergone the above-mentioned acid treatment, hot-water treatment, or washing with an organic solvent, and then, thermal oxidation treatment. Undergoing the thermal oxidation treatment decreases the amount of gas generated during melt-molding, and makes it more likely to enhance the mechanical strength.

In this regard, thermal oxidation treatment as used herein refers to heating a PPS resin under an oxygen atmosphere or heating a PPS resin supplemented with a peroxide such as $H_2O_2$ or a vulcanizing agent such as S. From the viewpoint of easy and convenient treatment, heating under an oxygen atmosphere is particularly preferable.

A heating device for thermal oxidation treatment of a PPS resin may be a common hot-air dryer, or may be a heating device of a rotary type or with stirring vanes. A heating device of a rotary type or with stirring vanes is more preferably used when efficient and further uniform treatment is desired. The oxygen concentration of the atmosphere for thermal oxidation treatment is desirably 1 vol % or more, more desirably 2 vol % or more. To achieve the desired effects, the upper limit of the oxygen concentration is preferably 5 vol % or less. Performing thermal oxidation treatment at an oxygen concentration of 5 vol % or less prevents the thermal oxidation treatment from progressing excessively, and does not result in impairing the toughness of a molded article containing the PPS resin obtained through the thermal oxidation treatment. In addition, performing thermal oxidation treatment at an oxygen concentration of 1 vol % or more makes it possible to perform sufficient thermal oxidation treatment, makes it possible to obtain a PPS resin having a smaller amount of volatile component, and thus, is preferable.

The thermal oxidation treatment temperature for a PPS resin is preferably 160 to 270° C., more preferably 160 to 230° C. Performing thermal oxidation treatment at 270° C. or less prevents the thermal oxidation treatment from progressing abruptly, does not result in impairing the toughness of a molded article containing the PPS resin obtained through the thermal oxidation treatment, and thus, is preferable. On the other hand, performing thermal oxidation treatment at a temperature of 160° C. or more enables the thermal oxidation treatment to progress at an appropriate speed, makes it possible to obtain a PPS resin having a smaller amount of volatile component generated, and thus, is preferable.

The time for thermal oxidation treatment is preferably 0.5 to 30 hours, more preferably 0.5 to 25 hours, still more preferably 2 to 20 hours. The time of 0.5 hour or more for the treatment makes it possible to perform sufficient thermal oxidation treatment, makes it possible to obtain a PPS resin having a smaller amount of volatile component, and thus, is preferable. The time of 30 hours or less for the treatment makes it possible to control the cross-linking reaction caused by the thermal oxidation treatment, does not impair the toughness of a molded article containing the PPS resin obtained through the thermal oxidation treatment, and thus, is preferable.

It is considered that, in the PPS resin that has undergone thermal oxidation treatment in such a manner, the end group changes, but the structure of the PPS resin obtained through thermal oxidation treatment is difficult to represent by a general formula, difficult to identify by the characteristics, and thus, can be identified only by the process (thermal oxidation treatment) for obtaining the PPS resin.

The PPS resin generates gas volatilized more preferably in an amount of 0.3 wt % or less when the PPS resin is melted by heating in vacuo at 320° C. for two hours. The gas generated in an amount of 0.3 wt % or less does not allow the volatile component adhered to a mold or a bent part of a mold to increase, and makes it less likely to cause defective transfer or gas burning. The lower limit of the amount of gas generation is not limited to any particular value, but a longer time necessary for polymer washing or thermal oxidation treatment, which is an example of a technique for decreasing the amount of gas generation, is economically more disadvantageous.

In this regard, the amount of gas generation means the amount of adhesive component resulting from gas liquefied or solidified by cooling, in which the gas is volatilized from a PPS resin melted by heating in vacuo. The amount is measured using a tubular furnace in which a PPS resin vacuum-encapsulated in a glass ampoule is heated. The shape of the glass ampoule to be used has a body part 100 mm×25 mm, a neck part 255 mm×12 mm, and a thickness of 1 mm. In a specific measurement method, the body part of the glass ampoule in which a PPS resin is vacuum-encapsulated is inserted into a tubular furnace at 320° C., and heated for two hours. The volatile gas is cooled by and adhered to that neck part of the ampoule which is not heated by the tubular furnace. This neck part is cut out and weighed, and then, the gas adhered is dissolved in chloroform to be removed. Then, this neck part is dried and weighed out again. The amount of gas generation is determined from a difference in the weight of the neck part of the ampoule between before and after the gas is removed.

The melt flow rate ("MFR") of the resulting PPS resin having undergone the above-mentioned preliminary step, polymerization reaction step, collection step, preferably washing step, and heating treatment step is preferably 1000 g/10 min or more, 1500 g/10 min or more, still more preferably 3000 g/10 min or more. An MFR of 1500 g/10 min or more leads to affording excellent flowability and good mold-ability. The MFR is a value measured under a load of 5000 g at a measurement temperature of 315.5° C. in accordance with ASTM-D1238-70.

The PPS resin preferably exhibits an ash content of 0.3 wt % or less when washed at 550° C. Exhibiting the ash content of 0.3 wt % or less means that the PPS resin contains a suitably small amount of metal. Containing a suitably small amount of metal provides excellent electrical insulation properties, good melt flowability, and excellent moist heat resistance.

The PPS resin remains preferably in a residue amount of 4.0 wt % or less when dissolved in a 20-fold amount by weight of 1-chloronaphthalene at 250° C. for 5 minutes, and filtrated under pressure and heat through a PTFE membrane filter having a pore size of 1 μm. The residue amount of 4.0 wt % or less means that the thermal oxidation cross-linking of the PPS resin does not progress excessively, and that the resin has a suitably small amount of gelled matter. Preventing the thermal oxidation cross-linking of the PPS resin from progressing excessively allows the PPS resin to maintain the toughness well and have excellent mechanical strength. The lower limit of the residue amount is not limited to any particular value, and is 1.5 wt % or more, preferably 1.7 wt % or more. With the residue amount of less than 1.5 wt %, the degree of thermal oxidation cross-linking is too low, and thus, the volatile component does not decrease very much during melting, posing the possibility that the effect of decreasing the volatile component is small.

The PPS resin composition includes a blend of 100 parts by weight of a polyphenylene sulfide resin (A) and 100 to 250 parts by weight of a modified cross-section glass fiber (B).

The modified cross-section glass fiber (B) is a glass fiber having a flat cross-section (hereinafter referred to as a flat glass fiber for short in some instances). When the glass fiber is cut perpendicularly to the length direction to present a cross-section, the ratio (a flattening ratio) of the major axis (the longest direct distance of the cross-section) to the minor axis (the longest direct distance in the direction perpendicular to the major axis) is preferably 1.3 to 10. The flattening ratio is preferably 1.5 to 7, still more preferably 1.5 to 5. This flattening ratio of 1.3 or more provides the resin composition with good toughness and dimensional accuracy, and 10 or less provides the resin composition with good strength.

The cross-section of the flat glass fiber preferably has a major axis of 10 to 80 μm, thus enabling the spinning of the glass fiber to be easier, and enabling the glass fiber to maintain high strength. The major axis is more preferably 15 μm or more and 50 μm or less. In addition, the cross-section preferably has a minor axis of 2 to 20 μm, more preferably 4 μm or more and 15 μm or less.

In this regard, the cross-section of each of 50 glass fibers selected randomly is observed using a scanning electron microscope, the major axis and the minor axis of the glass fiber cross-section are measured, the ratio therebetween is calculated, and the number-average value is determined as the major axis/minor axis ratio (flattening ratio) by calculation.

A flat glass fiber has a larger specific surface area than a glass fiber having an equal cross-sectional area and a circular cross-sectional shape. In addition, the glass fibers are more easily oriented in the flow direction of the molded article, and thus, the glass fibers collide less with each other during molding, thus being inhibited from breaking. In addition, the orientation decreases the anisotropy of the molded article more. The anisotropy as used herein refers to a difference in the coefficient of linear expansion of a test piece, 80 mm×80 mm×3 mm in thickness, between the flow direction of the resin (machine direction ("MD direction")) and the direction perpendicular to the flow direction (traverse direction ("TD direction")), and also a difference in the creep transformation of the ½ shape (hereinafter referred to as a half-dumbbell) of a test piece cut out of the rectangular plate to be shaped in accordance with Type 1B described in JIS K 7161 (2014). Creep transformation refers to the amount of plastic transformation obtained by subtracting the amount of elastic transformation from the amount of the whole transformation in terms of tensile creep transformation. A smaller anisotropy means a smaller difference in various characteristics such as the coefficient of linear expansion and creep transformation between the TD direction and MD direction. Using a resin composition having smaller anisotropy makes it possible to obtain a molded article having excellent mechanical strength, weld strength, impact strength, and high-temperature rigidity.

The blending amount of the modified cross-section glass fiber (B) is 100 to 250 parts by weight relative to 100 parts by weight of the polyphenylene sulfide resin (A) mentioned above. Less than 100 parts by weight of the modified cross-section glass fiber (B) relative to 100 parts by weight of the polyphenylene sulfide resin (A) causes a difference due to anisotropy. The blending amount is preferably 110 parts by weight or more. More than 250 parts by weight of the modified cross-section glass fiber (B) relative to 100 parts by weight of the polyphenylene sulfide resin (A) leads to impairing the flowability and influencing the moldability. The blending amount is preferably 220 parts by weight or less.

The polyphenylene sulfide resin composition includes the non-fibrous inorganic filler (C) blended in amount of 25 to 150 parts by weight relative to the polyphenylene sulfide resin (A).

The non-fibrous inorganic filler (C) is characterized by satisfying (C-a) and (C-b) as follows:
   (C-a) having a Mohs hardness of more than 2 and less than 4, and
   (C-b) having a melting point or softening point of 380° C. or more.

The Mohs hardness means the 10-stage Mohs hardness. A Mohs hardness of 2 or less causes a modified cross-section glass kneaded simultaneously to cause transformation and deteriorate the dimensional stability. In addition, 4 or more leads to accelerating wear of processing jigs such as a molding machine. The Mohs hardness is preferably more than 2.5 and less than 4. In this regard, the Mohs hardness is defined as follows: a measurement is taken of the Mohs hardness of a precursory non-fibrous inorganic filler that is yet to be in ready-to-use shape (particulate shape) and is in a state blocky to some degree; and the measurement value is regarded as "the Mohs hardness of the non-fibrous inorganic filler (C)."

The processing temperature for the PPS resin is 300 to 340° C., and a shearing force applied to the resin causes the resin temperature to be 380° C. or more in some instances. Accordingly, a non-fibrous inorganic filler that contributes to the dimensional stability needs to have shape stability at the processing temperature, and thus, the non-fibrous inorganic filler (C) needs to have a melting point or softening point of 380° C. or more, preferably a melting point or softening point of 400° C. or more. The melting point or softening point is not limited to any particular upper limit value, and is approximately 2,000° C. for a practically usable kind of non-fibrous inorganic filler. The melting point or softening point is defined as a value measured by differential scanning calorimetry (DSC).

Specific examples of such a non-fibrous inorganic filler (C) to be used include non-fibrous fillers such as the following: mica; carbonates such as calcium carbonate, magnesium carbonate, and dolomite; sulfates such as calcium sulfate and barium sulfate. These may be hollow, and furthermore, two or more of these non-fibrous inorganic fillers can be used in combination. In addition, such a non-fibrous inorganic filler may be used after being treated preliminarily with a coupling agent such as an isocyanate compound, organic silane compound, organic titanate compound, organic borane compound, or epoxy compound.

Among these, at least one selected from mica and calcium carbonate is preferable from the viewpoint of decreasing the thermal expansion of the material, and calcium carbonate is preferable from the viewpoint of decreasing the anisotropy.

In addition, examples of the non-fibrous inorganic filler (C) include none of hexagonal boron nitride, magnesium hydroxide, talc, magnesium oxide, and aluminium nitride.

The blending amount of the non-fibrous inorganic filler (C) in a PPS resin composition is 25 to 150 parts by weight, preferably 30 parts by weight to 130 parts by weight, relative to 100 parts by weight of the PPS resin (A).

Furthermore, the modified cross-section glass fiber (B) and the non-fibrous inorganic filler (C) need to be used in combination to express excellent low anisotropy. The ratio X/Y of the blending weight X of the modified cross-section glass fiber (B) to the blending weight Y to the non-fibrous inorganic filler (C) relative to 100 parts by weight of the polyphenylene sulfide resin (A) is more than 1 and less than 7. The ratio is preferably more than 1 and less than 5. When the ratio X/Y is 1 or less, that is, when the blending weight of the modified cross-section glass fiber (B) and the blending weight of the non-fibrous inorganic filler (C) are the same, or when the blending weight of the modified cross-section glass fiber (B) is smaller than the blending weight of the non-fibrous inorganic filler (C), it is not possible to control the anisotropy of the molded article and, furthermore, the dimensional change during moist heat expansion becomes markedly large. On the other hand, when the ratio X/Y is 7 or more, that is, when the blending weight of the modified cross-section glass fiber (B) is much larger and where the blending weight of the non-fibrous inorganic filler (C) is smaller, the modified cross-section glass has a larger influence, thus causing the coefficient of linear expansion to increase, and furthermore causing the low anisotropy to be lost.

Furthermore, the PPS resin composition preferably contains an additive alkoxysilane compound having at least one functional group selected from an epoxy group, amino group, isocyanate group, hydroxyl group, mercapto group, and ureido group, for the purpose of enhancing the mechanical strength, toughness and the like. Specific examples of such compounds include the following: epoxy group-containing alkoxy-silane compounds such as 65 -glycidoxypropyltrimethoxysilane, γ-glycidoxypropyltriethoxysilane, and β-(3,4-epoxy cyclohexyl)ethyltrimethoxysilane; mercapto group-containing alkoxysilane compounds such as γ-mercaptopropyltrimethoxysilane and γ-mercaptopropyltriethoxysilane; ureido group-containing alkoxysilane compounds such as γ-ureidopropyltriethoxysilane, γ-ureido propyltrimethoxysilane, and γ-(2-ureidoethyl)aminopropyltrimethoxysilane; isocyanate group-containing alkoxysilane compounds such as γ-isocyanate propyltriethoxysilane, γ-isocyanate propyltrimethoxysilane, γ-isocyanate propylmethyldimethoxysilane, γ-isocyanate propylmethyldiethoxysilane, γ-isocyanate propylethyldimethoxysilane, γ-isocyanate propylethyldiethoxysilane, and γ-isocyanate propyltrichlorosilane; amino group-containing alkoxysilane compounds such as γ-(2-aminoethyl)aminopropylmethyldimethoxysilane, γ-(2-aminoethyl)aminopropyltrimethoxysilane, γ-aminopropyltrimethoxysilane, and γ-aminopropyltriethoxysilane; hydroxyl group-containing alkoxysilane compounds such as γ-hydroxypropyltrimethoxysilane and γ-hydroxypropyltriethoxysilane; and the like. Among these, alkoxy silanes having an epoxy group, amino group, isocyanate group, or hydroxyl group are particularly suitable to obtain excellent weld strength. The preferred addition amount of such a silane compound is 0.1 to 3 parts by weight relative to 100 parts by weight of the PPS resin (A).

The PPS resin composition may be further blended with a resin (D) other than the PPS resin (A) (the resin (D) is hereinafter referred to as another resin (D) in some instances) before use, to the extent that the desired effects are not impaired. Specific examples of resins that can be blended include, but are not limited particularly to, the following: polyamides such as nylon 6, nylon 66, nylon 610, nylon 11, nylon 12, and aromatic nylons; polyester resins such as polyethylene terephthalate, polybutylene terephthalate, polycyclohexyldimethylene terephthalate, and polynaphthalene terephthalate; polyethylene; polypropylene; polytetrafluoroethylene; polyolefin elastomers; polyether ester elastomers; polyether amide elastomers; polyamideimides; polyacetals; polyimides; polyphenylene ethers; polyether imides; polyether sulfones; polysulfone resins; polyallylsulfone resins; polyketone resins; polyallylate resins; liquid crystal polymers; polyether ketone resins; polythioether ketone resins; polyetherether ketone resins; polyamideimide resins; polytetrafluoroethylene resins; epoxy group-containing polyolefin copolymers; bisphenol epoxy resins such as of a bisphenol A type; novolac phenol epoxy resins; cresol novolac epoxy resins; and the like. In particular, polyimides, polyphenylene ethers, polyether imides, and polyether sulfones are desirable for the purpose of inhibiting the thermal transformation of the PPS resin at a temperature equal to or greater than the glass transition temperature (approximately 80° C.). The preferred addition amount of such another resin (D) is 0 to 20 parts by weight relative to 100 parts by weight of the PPS resin (A).

In this regard, the PPS resin composition can be supplemented with a component(s) other than above-mentioned, to the extent that the desired effects are not impaired. Examples of such components include the following: antioxidants and heat stabilizers (hydroquinone-based); weathering agents (resorcinol-based, salicylate-based, benzotriazole-based, benzophenone-based, hindered amine-based and the like); release agents and lubricants (montan acid and metal salts thereof, esters thereof, half esters thereof, stearyl alcohols, stearamides, bisureas, polyethylene wax and the like); pigments (cadmium sulfide, phthalocyanine, carbon black for coloring and the like); dyes (nigrosin and the like); plasticizers (octyl p-oxybenzoate, N-butylbenzene sulfone amide and the like); antistatic agents (alkylsulfate type anionic antistatic agents, quaternary ammonium salt type cationic antistatic agents, nonionic antistatic agents such as polyoxyethylene sorbitan monostearate, betaine amphoteric antistatic agents and the like); flame retardants (for example, red phosphorus, phosphate esters, melamine cyanulate, polyphosphoric acid ammonium, brominated polystyrene, brominated polyphenylene ethers, brominated polycarbonates, brominated epoxy resins, combinations of these bromine flame retardants and antimony trioxide and the like); heat stabilizers; lubricants such as calcium stearate, aluminium stearate, and lithium stearate; and usual additives such as anti-ultraviolet agents, coloring agents, flame retardants, and foaming agents.

The PPS resin composition is not limited to any particular preparation method. Representative examples of such methods include a method in which raw materials are supplied into a usual known melt-mixing machine such as a single-screw or twin-screw extruder, Banbury mixer, kneader, or mixing roll, and kneaded at a temperature of 280 to 380° C. The raw materials are not limited to any particular mixing order, and any method may be used such as the following: a method in which all the raw materials are blended before being melt-kneaded by the above-mentioned method; a method in which part of the raw materials are blended before being melt-kneaded by the above-mentioned method, and the remaining raw materials are further blended and melt-kneaded; a method in which part of the raw materials are blended and melt-kneaded using a single-screw or twin-screw extruder, during which the remaining raw materials are added using a side feeder, and mixed; and the like. It is also possible that a component(s) to be added in a small amount is/are added before molding and after the other components are kneaded by the above-mentioned method or the like and pelletized, and that the resulting mixture is used for molding.

EXAMPLES

Below, our resins, resin compositions and molded articles will be more specifically described with reference to Examples, and this disclosure is not limited to the description of the Examples.
Method of Evaluating PPS Resin Produced
(1) Melt Flow Rate (MFR)

A measurement was taken under a load of 5000 g at a measurement temperature of 315.5° C. in accordance with ASTM-D1238-70.

With a polyphenylene sulfide resin having a low viscosity, however, the following method was used to calculate the MFR. The ER of a polyphenylene sulfide resin was measured under a load of 345 g at a measurement temperature of 315.5° C. by the method pursuant to ASTM-D1238-70, and the value of the MFR was calculated in accordance with the following equation [I]:

$$MFR = 15.8 \times 4.4 \times ER \qquad [I].$$

(2) Residue Amount

A PTFE membrane filter having a pore size of 1 μm was preliminarily weighed and set in a stainless steel test tube including a pneumatic cap and a collection funnel manufactured by Senshu Scientific Co. Ltd. Then, 100 mg of PPS resin pressed to form a film having a thickness of approximately 80 μm and 2 g of 1-chloronaphthalene were weighed out and introduced into the test tube, which was then sealed. The resulting mixture was introduced into a high-temperature filtration device SSC-9300 manufactured by Senshu Scientific Co., and shaken under heating at 250° C. for five minutes so that the PPS resin was dissolved in the 1-chloronaphthalene. A 20-mL syringe containing air was connected to a pneumatic cap, and then, the piston was pushed in to filtrate the solution through the membrane filter. The membrane filter was taken out, dried in vacuo at 150° C. for one hour, and weighed. A difference in the weight of the membrane filter between before and after filtration relative to the weight of the PPS pressed into a film and fed was regarded as a residue amount (wt %).

Reference Example

Into a 70-liter autoclave with a stirrer and a bottom stop valve, 8.27 kg (70.00 mol) of 47.5% sodium hydrosulfide, 2.91 kg (69.80 mol) of 96% sodium hydroxide, 11.45 kg (115.50 mol) of N-methyl-2-pyrrolidone (hereinafter referred to as NMP), and 10.5 kg of ion-exchanged water were fed. The resulting mixture was gradually heated under a normal-pressure nitrogen stream at 245° C. over approximately three hours to distill off 14.78 kg of water and 0.28 kg of NMP, and then, the reaction container was cooled to 200° C. The amount of water remaining in the system, containing the moisture consumed by hydrolysis of NMP, was 1.06 mol per 1 mol of the alkali metal sulfide fed. In addition, the amount of hydrogen sulfide scattered was 0.02 mol per 1 mol of the alkali metal sulfide fed.

Then, the resulting mixture was cooled to 200° C., and 10.48 kg (71.27 mol) of p-dichlorobenzene and 9.37 kg (94.50 mol) of NMP were added into the reaction container, which was sealed under nitrogen gas. The temperature of the resulting mixture was raised from 200° C. to 270° C. at a speed of 0.6° C./min with stirring at 240 rpm. The resulting mixture was allowed to react at 270° C. for 100 minutes, and then the bottom stop valve of the autoclave was opened. The contents were poured into the container with a stirrer under pressurized nitrogen over 15 minutes, and stirred at 250° C. for a while to remove most of the NMP.

The resulting solid and 76 liters of ion-exchanged water were introduced into an autoclave with a stirrer, washed at 70° C. for 30 minutes, and then, filtrated by suction through a glass filter. Then, 76 liters of ion-exchanged water heated to 70° C. was poured into the glass filter, and filtrated by suction to yield a cake.

The resulting cake and 90 liters of ion-exchanged water were fed into an autoclave with a stirrer, and supplemented with acetic acid to have a pH of 7. The inside of the autoclave was purged with nitrogen, then heated to 192° C., and held for 30 minutes. Then, the autoclave was cooled, and the contents were taken out.

The contents were filtrated by suction through a glass filter, and into the resulting product, 76 liters of ion-exchanged water at 70° C. was poured. The resulting mixture was filtrated by suction to yield a cake. The resulting cake was dried under a nitrogen gas stream at 120° C. to yield a dried PPS. The resulting PPS had an ER of 90 g/10 min, which was 6257 g/10 min in terms of the MFR, and the residue amount was 1.2 wt %.

The raw materials used in Examples and Comparative Examples are as below-mentioned.
PPS Resin (A)
PPS: a PPS resin polymerized by the method described in Reference Example
Modified Cross-section Glass Fiber (B)
Flat glass fiber: ECS-03-971EW (manufactured by Nippon Electric Glass Co., Ltd.; having a flattening ratio of 4)
Non-fibrous Inorganic Filler (C)
C-1: heavy calcium carbonate (KSS-1000, manufactured by Calfine Co., Ltd.), having a Mohs hardness of 3 and a melting point of 82° C. (decomposed)
C-2: talc (PK-S, manufactured by Hayashi Kasei Co., Ltd.), having a Mohs hardness of 1 and a melting point of >450° C. (decomposed)
Another Resin (D)
D-1: polyether sulfone (Sumika Excel 3600P, manufactured by Sumitomo Chemical Co., Ltd.)
D-2: polyether imide (Ultem 1010, manufactured by Saudi Basic Industries Corporation)
D-3: polyphenylene ether (XYROS202A, manufactured by Asahi Kasei Corporation)
Fibrous filler (B') (Comparative Example: a glass fiber which does not correspond to the component (B))
B'-1: chopped strand (T-717, manufactured by Nippon Electric Glass Co., Ltd.; having an average fiber diameter of 13 μm and a flattening ratio of 1)
B'-2: chopped strand (T-747H, manufactured by Nippon Electric Glass Co., Ltd.; having an average fiber diameter of 13 μm and a flattening ratio of 1)

Method of Measurement and Evaluation

The methods of measurement and evaluation in Examples and Comparative Examples are as below-mentioned.

Measurement of Flexural Strength and Bending Modulus

A measurement was taken in accordance with ISO178 (2001). Specifically, the measurement was taken as below-mentioned. Resin composition pellets were supplied into an injection molding machine (SE50DUZ-C160) manufactured by Sumitomo Heavy Industries, Ltd., with the cylinder temperature set to 310° C. and with the mold temperature set to 145° C., filled at a filling time of 0.8 s, and injection-molded at a holding pressure of 75% of the filling pressure to yield a test piece in the shape of type B2 prescribed in ISO 20753 (2008). This test piece was controlled under conditions at 23° C. and a relative humidity of 50% for 16 hours, and used for measurement under conditions at a span of 64 mm at a strain rate of 2 mm/min in an atmosphere at 23° C. and a relative humidity of 50%.

Coefficient of Linear Expansion

In the measurement of the coefficient of linear expansion of the PPS resin, a flat plate for cutting 4 that was a square having a side SL of 80 mm and a thickness D of 3 mm was used to produce a test piece, as depicted in FIG. 1. As depicted in FIG. 3, test pieces having a width W of 5 mm, a length L of 10 mm, and a thickness D of 3 mm were produced, by cutting, out of the flat plates at the positions depicted in FIG. 2, and were used as a test piece 5 and a test piece 6, the length directions of which were respectively the resin flow direction MD and the direction TD perpendicular to the resin flow direction. In this regard, an injection molding machine NEX-1000-9E manufactured by Nissei Plastic Industrial Co., Ltd. was used to produce the above-mentioned flat plate for cutting 4 by injection molding under the following conditions: a cylinder temperature of 320° C.; an injection pressure obtained by adding 12.8 MPa to the lower limit pressure for molding; an injection time of 15 sec; and a cooling time of 15 sec.

Figure 1B:
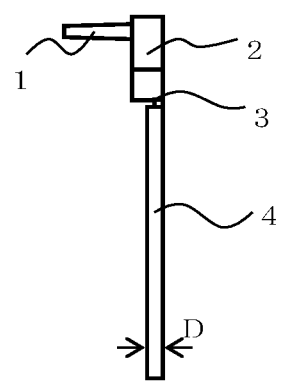
Figure 2:
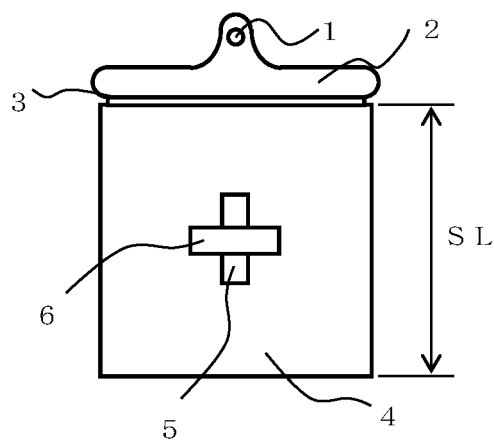
FIG. 2 is a view depicting the cutting positions of a test piece for measuring the coefficient of linear expansion.
Figure 3A:
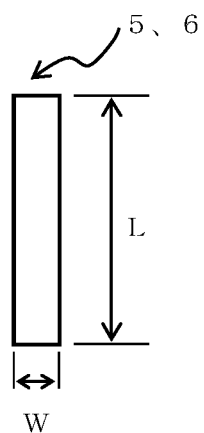
FIGS. 3(a) and (b) include (a) a top view and (b) a side view that depict the shape of a test piece for measuring the coefficient of linear expansion.
Figure 3B:
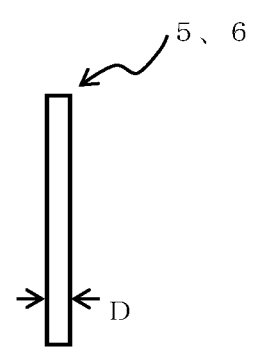

FIG. 1(a) is a top view of the above-mentioned flat plate for cutting 4 for producing a test piece, and FIG. 1(b) is a side view of the same flat plate for cutting 4. This flat plate for cutting 4 for producing a test piece related to the coefficient of linear expansion had a sprue 1, a runner 2, and a gate 3, and was cut at the positions depicted in FIG. 2 to produce the test pieces 5 and 6 in the shape depicted in FIG. 3. FIG. 3(a) is a top view of the test piece 5 or 6, and FIG. 3(b) is a side view of the test piece 5 or 6.

Using TMA-100 manufactured by Seiko Instruments Inc., the temperature was raised under a load of 2 g in the temperature region of from −50° C. to 200° C. at a speed of 5° C./min., and the coefficient of linear expansion was expressed by values in the temperature range of from −40° C. to 150° C.

Swelling Properties

The swelling properties of a PPS resin were evaluated using a test piece produced by injection molding under just the same conditions as the test piece produced in the measurement of the coefficient of linear expansion.

This test piece was treated in a high-temperature and high-humidity environment at a temperature of 85° C. and a humidity of 85% RH for 1,000 hours, and the swelling ratios were measured in the MD direction and the TD direction. The swelling ratio is represented by formula (2):

Swelling Ratio (%)=[Dimension (mm) after Treatment−Initial Dimension (mm)]/Initial Dimension (mm)×100   (2).

In this regard, the measurement position of the dimension was defined as the centerline of each of the MD direction and the TD direction, as denoted by the respective arrows drawn in the flat plate for cutting 4 in FIG. 1.

Creep Transformation

In the evaluation of the creep transformation of the PPS resin, a flat plate for cutting 4 that was a square having a side SL of 80 mm and a thickness D of 3 mm was used to produce a test piece, as depicted in FIG. 1. At the positions denoted by 5 and 6 in the flat plates in FIG. 2, test pieces were cut out into the ½ shape (half-dumbbell) of the test piece shape Type 1B described in JIS K 7161 (2014), in order that a creep transformation evaluation test could be performed in each of the resin flow direction MD and the direction TD perpendicular to the resin flow direction.

A tensile creep treatment was performed on this test piece with a clamp distance of 55 mm under a load of 12.5 MPa, and the elongation (plastic transformation) was measured both one minute and 40 hours after the start of the test. The creep ratio is represented by formula (3):

Creep Ratio (%)=Plastic Transformation in MD Direction (mm)/Plastic Transformation in TD Direction (mm)×100   (3).

Examples 1 to 7

Using a twin-screw extruder (TEM-26 manufactured by Toshiba Machine Co., Ltd.) including a midpoint addition inlet having a diameter of 26 mm with the cylinder temperature set to 320° C. and with the screw rotation speed set to 400 rpm, 100 parts by weight of the PPS resin (A) obtained in Reference Example and the non-fibrous inorganic filler (C) and/or the another resin (D) at a weight ratio seen in Table 1 were introduced through the raw material supply inlet, and made molten. The modified cross-section glass fiber (B) and/or the fibrous filler (B') at a weight ratio seen in Table 1 was/were supplied through the midpoint addition inlet, and the resulting mixture was melt-kneaded at a discharge rate of 30 kg/hour to yield pellets. These pellets were used to evaluate the above-mentioned characteristics. The results are listed in Table 1.

The results of Examples 1 to 7 have revealed that our PPS resin compositions have low linear expansion, low anisotropy, and low swelling properties.

TABLE 1

| Components | | | Example 1 | Example 2 | Example 3 | Example 4 | Example 5 | Example 6 | Example 7 |
|---|---|---|---|---|---|---|---|---|---|
| (A) PPS | | Parts by weight | 100 | 100 | 100 | 100 | 100 | 100 | 100 |
| (B) Flat Glass Fiber | | Parts by weight | 198 | 168 | 198 | 164 | 139 | 116 | 153 |
| (C) Non-fibrous Inorganic Filler | C-1 | Parts by weight | 111 | 94 | 111 | 72 | 46 | 32 | 50 |
| | C-2 | Parts by weight | | | | | | | |
| (D) Other Resin | D-1 | Parts by weight | | | 17 | 14 | 12 | 11 | 13 |
| | D-2 | Parts by weight | | 17 | | | | | |
| | D-3 | Parts by weight | | | | | | | |

TABLE 1-continued

| Components | | | Example 1 | Example 2 | Example 3 | Example 4 | Example 5 | Example 6 | Example 7 |
|---|---|---|---|---|---|---|---|---|---|
| (B') Fibrous Filler | B'-1 | Parts by weight | | | | | | | |
| | B'-2 | Parts by weight | | | | | | | |
| X/Y | | | 1.8 | 1.8 | 1.8 | 2.3 | 3.1 | 3.7 | 3.1 |
| Flexural Strength | | MPa | 224 | 200 | 220 | 260 | 253 | 267 | 256 |
| Flexural Modulus | | GPa | 24.5 | 24.0 | 24.8 | 23.2 | 21.4 | 18.9 | 16.6 |
| Coefficient of Linear | MD | ×10$^{-5}$/K | 1.6 | 1.8 | 1.6 | 1.7 | 1.8 | 1.9 | 1.8 |
| Expansion | TD | ×10$^{-5}$/K | 1.6 | 1.7 | 1.5 | 1.7 | 1.8 | 1.8 | 1.7 |
| Swelling Property | MD | % | 0.03 | 0.05 | 0.04 | 0.06 | 0.05 | 0.04 | 0.05 |
| (Swelling Ratio) | TD | % | 0.03 | 0.06 | 0.05 | 0.05 | 0.05 | 0.03 | 0.07 |
| (85° C., 85% RH × 1,000 hr) | | | | | | | | | |
| Creep | MD | mm | 0.058 | 0.059 | 0.058 | 0.058 | 0.059 | 0.065 | 0.063 |
| Transformation[1] | TD | mm | 0.059 | 0.058 | 0.058 | 0.068 | 0.078 | 0.096 | 0.079 |
| Creep Ratio | | | 1.0 | 1.0 | 1.0 | 1.2 | 1.3 | 1.5 | 1.3 |

[1]Plastic Deformation Amount at 125° C., 12.5 Mpa, 40 hr

Comparative Examples 1 to 7

Using the same twin-screw extruder as used in Examples 1 to 7, 100 parts by weight of the PPS resin (A) obtained in Reference Example and the non-fibrous inorganic filler (C) and/or the another resin (D) at a weight ratio seen in Table 2 were introduced through the raw material supply inlet, and made molten. The modified cross-section glass fiber (B) and/or the fibrous filler (B') at a weight ratio seen in Table 2 was/were supplied through the midpoint addition inlet, and the resulting mixture was melt-kneaded at a discharge rate of 30 kg/hour to yield pellets. These pellets were used to evaluate the above-mentioned characteristics. The results are listed in Table 2.

Comparative Example 1 revealed that use of no modified cross-section glass fiber caused the coefficient of linear expansion to be larger, resulting in causing anisotropy. Furthermore, the results have revealed that less than 1 as the ratio of the glass fiber to the non-fibrous filler also caused the swelling properties to be poor.

Comparative Examples 2 and 3 revealed that use of no modified cross-section glass fiber caused the coefficient of linear expansion to be larger, resulting in causing anisotropy. On the other hand, the results have revealed that less than 1 as the ratio of the glass fiber to the non-fibrous filler caused the swelling properties to be poor.

In Comparative Examples 4 and 5, use of the modified cross-section glass fiber resulted in successfully controlling the coefficient of linear expansion, but the non-fibrous filler was used in a larger amount, that is, the X/Y ratio was 7 or more, thus failing to reduce the anisotropy of the coefficient of linear expansion sufficiently.

In Comparative Example 6, use of the modified cross-section glass fiber resulted in successfully controlling the coefficient of linear expansion, but the modified cross-section glass fiber and the non-fibrous filler were added in the same amount (the X/Y ratio was 1), thus causing anisotropy.

Comparative Example 7 revealed that use of a talc having a low Mohs hardness caused a larger difference in the linear expansion anisotropy. In addition, the results revealed that a significantly larger decrease in strength was also caused than in Example 3.

TABLE 2

| Components | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| (A) PPS | | Parts by weight | 100 | 100 | 100 | 100 | 100 | 100 | 100 |
| (B) Flat Glass Fiber | | Parts by weight | 0 | 0 | 0 | 82 | 210 | 127 | 198 |
| (C) Non-fibrous | C-1 | Parts by weight | 166 | 127 | 140 | 1 | 28 | 127 | |
| Inorganic Filler | C-2 | Parts by weight | | | | | | | 111 |
| (D) Other Resin | D-1 | Parts by weight | | | | | 15 | | 17 |
| | D-2 | Parts by weight | | | | | | | |
| | D-3 | Parts by weight | 10 | 0 | 11 | | | | |
| (B') Fibrous Filler | B'-1 | Parts by weight | 69 | 127 | | | | | |
| | B'-2 | Parts by weight | | | 109 | | | | |
| X/Y | | | 0 | 0 | 0 | 90.0 | 7.6 | 1.0 | 2.3 |
| Flexural Strength | | MPa | 181 | 216 | 158 | 309 | 292 | 237 | 157 |
| Flexural Modulus | | GPa | 16.4 | 22.4 | 20.0 | 16.9 | 15.9 | 22.8 | 24.8 |
| Coefficient of Linear | MD | ×10$^{-5}$/K | 2.1 | 2.0 | 1.9 | 1.9 | 2.1 | 1.8 | 1.6 |
| Expansion | TD | ×10$^{-5}$/K | 2.8 | 2.5 | 2.6 | 2.1 | 2.2 | 2.0 | 1.9 |
| Swelling Property | MD | % | 0.10 | 0.06 | 0.07 | 0.04 | 0.05 | 0.04 | 0.10 |
| (Swelling Ratio) | TD | % | 0.12 | 0.07 | 0.09 | 0.03 | 0.05 | 0.05 | 0.12 |
| (85° C., 85% RH × 1,000 hr) | | | | | | | | | |
| Creep | MD | mm | 0.054 | 0.054 | 0.054 | 0.062 | 0.065 | 0.058 | 0.058 |
| Transformation[1] | TD | mm | 0.091 | 0.142 | 0.094 | 0.079 | 0.067 | 0.062 | 0.058 |
| Creep Ratio | | | 1.7 | 2.6 | 1.7 | 1.3 | 1.0 | 1.1 | 1.0 |

[1]Plastic Deformation Amount at 125° C., 12.5 Mpa, 40 hr

INDUSTRIAL APPLICABILITY

Our PPS resin composition can be used for various kinds of molded articles such as injection molding, extrusion molding, blow molding, and transfer molding, and is suitable for use for injection molding in particular.

As above-mentioned, the PPS resin composition makes it possible to obtain a PPS resin composition having excellent low anisotropy in terms of the coefficient of linear expansion and the creep transformation without significantly impairing various inherent properties such as excellent mechanical properties and chemical resistance. Accordingly, the PPS resin composition is useful for a molded article that needs dimensional accuracy and holds an article by contact pressure. In particular, applications related to optical equipment and precision equipment that demand optical properties demand dimensional stability and smaller anisotropy of creep transformation caused when a lens is inserted under pressure and, thus, the resin composition is very useful in these applications. Specific examples include applications in which a lens is inserted under pressure such as microscopes, binoculars, cameras, and watches.

Other examples of applications for which the PPS resin composition can be used include the following: electrical and electronic parts typified by sensors, LED lamps, household connectors, sockets, resistors, relay cases, switches, coil bobbins, capacitors, variable capacitor cases, radiators, various terminal blocks, transformers, plugs, printed boards, tuners, speakers, microphones, headphones, small motors, magnetic head bases, semiconductors, liquid crystals, FDD carriages, FDD chassis, motor brush holders, parabolic antennas, computer-related parts, and the like; and household and office electrical parts typified by VTR parts, television parts, irons, hair dryers, rice cooker parts, microwave oven parts, audio parts, sound equipment parts such as audio/laser discs (registered trademark)/compact discs, lighting parts, refrigerator parts, air conditioner parts, typewriter parts, word processor parts, and the like. Other examples of various applications include the following: office computer-related parts; mechanical parts typified telephone-related parts, facsimile-related parts, photocopier-related parts, washing jigs, motor parts, lighters, typewriters, and the like; water section parts such as city water faucet valves, mixing faucets, pump parts, pipe joints, water volume control valves, relief valves, hot water temperature sensors, water volume sensors, and water meter housings; automobile/vehicle-related parts such as valve alternator terminals, alternator connectors, IC regulators, potentiometer bases for light dimmers, various valves such as exhaust gas valves, various fuel-related/exhaust-system/induction-system pipes, air intake nozzle snorkels, intake manifolds, fuel pumps, engine cooling water joints, carburetor main bodies, carburetor spacers, exhaust gas sensors, cooling water sensors, oil temperature sensors, throttle position sensors, crankshaft position sensors, airflow meters, brake friction pad wear sensors, thermostat bases for air conditioners, heater air flow control valves, brush holders for radiator motors, water pump impellers, water pump housings, engine cool modules, turbine vanes, wiper motor-related parts, distributors, starter switches, starter relays, wire harnesses for transmission, window washer nozzles, air conditioner panel switch boards, coils for fuel-related electromagnetic valves, connectors for fuses, horn terminals, insulating plates for electrical and electronic parts, step motor rotors, lamp sockets, lamp reflectors, lamp housings, brake pistons, solenoid bobbins, engine oil filters, igniter cases, speed sensors, cable liners and the like.

The invention claimed is:

1. A polyphenylene sulfide resin composition comprising a blend of:
    100 parts by weight of a polyphenylene sulfide resin (A) having a minimum melt flow rate of 1000 g/10 min;
    100 to 250 parts by weight of a modified cross-section glass fiber (B) having a flattening ratio of 1.3 to 10; and
    25 to 150 parts by weight of a non-fibrous inorganic filler (C);
    wherein the non-fibrous inorganic filler (C): has a Mohs hardness of more than 2 and less than 4, has a melting point or softening point of 380° C. or more, and is selected from the group consisting of mica, carbonates, and sulfates;
    wherein a ratio X/Y of a blending weight X of said modified cross-section glass fiber (B) to a blending weight Y of said non-fibrous inorganic filler (C) is more than 1 and less than 7, such that the polyphenylene sulfide resin composition has low linear expansion, low anisotropy, and low swelling properties;
    wherein the low linear expansion corresponds to: a maximum coefficient of linear expansion in the machine direction (MD) of $1.9 \times 10^{-5}$/K and a maximum coefficient of linear expansion in the traverse direction (TD) of $1.8 \times 10^{-5}$/K;
    wherein the low anisotropy corresponds to: a maximum difference between the coefficient of linear expansion in the MD and the coefficient of linear expansion in the TD of $0.1 \times 10^{-5}$K, and a maximum creep ratio of 1.5; and
    wherein the low swelling properties correspond to: a maximum swelling ratio in the MD of 0.06% and a maximum swelling ratio in the TD of 0.07%.

2. The polyphenylene sulfide resin composition according to claim 1, wherein the flattening ratio is 1.5 to 7.

3. The polyphenylene sulfide resin composition according to claim 1, wherein the ratio X/Y is more than 1 and less than 5.

4. The polyphenylene sulfide resin composition according to claim 1, wherein said non-fibrous inorganic filler (C) is calcium carbonate.

5. The polyphenylene sulfide resin composition according to claim 1, wherein
    the carbonates are selected from calcium carbonate, magnesium carbonate, dolomite, and the sulfates are selected from calcium sulfate and barium sulfate.

6. A molded article composed of said polyphenylene sulfide resin composition according to claim 1.

7. A housing part comprising the molded article according to claim 6.

* * * * *